US011870145B2

(12) United States Patent
Tanbo

(10) Patent No.: US 11,870,145 B2
(45) Date of Patent: Jan. 9, 2024

(54) ANTENNA MODULE AND COMMUNICATION DEVICE INCORPORATING THE SAME

(71) Applicant: Murata Manufacturing Co., Ltd., Kyoto (JP)

(72) Inventor: Yasuo Tanbo, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 267 days.

(21) Appl. No.: 17/369,370

(22) Filed: Jul. 7, 2021

(65) Prior Publication Data

US 2021/0336349 A1 Oct. 28, 2021

Related U.S. Application Data

(63) Continuation of application No. PCT/JP2020/002728, filed on Jan. 27, 2020.

(30) Foreign Application Priority Data

Feb. 1, 2019 (JP) ................................ 2019-016980

(51) Int. Cl.
*H01Q 13/10* (2006.01)
*H01Q 5/307* (2015.01)
*H01Q 1/48* (2006.01)

(52) U.S. Cl.
CPC ............... *H01Q 13/10* (2013.01); *H01Q 1/48* (2013.01); *H01Q 5/307* (2015.01)

(58) Field of Classification Search
CPC .......... H01Q 13/10; H01Q 1/48; H01Q 5/307; H01Q 5/321; H01Q 1/523; H01Q 5/371; H01Q 21/28
See application file for complete search history.

(56) References Cited

U.S. PATENT DOCUMENTS

2008/0278384 A1 11/2008 Shimasaki et al.
2012/0287012 A1* 11/2012 Aizawa ................. H01Q 5/392 343/893
2015/0102974 A1 4/2015 Stoytchev et al.

FOREIGN PATENT DOCUMENTS

JP 2008-283464 A 11/2008
JP 2012-105125 A 5/2012
(Continued)

OTHER PUBLICATIONS

International Search Report for International Patent Application No. PCT/JP2020/002728 dated Apr. 7, 2020.
(Continued)

*Primary Examiner* — Daniel D Chang
(74) *Attorney, Agent, or Firm* — Pearne & Gordon LLP

(57) ABSTRACT

An antenna module (10) includes a ground electrode (30) in which a slit (33) is formed in such a manner as to form an opening along a perimeter of the ground electrode, a first antenna (110) and a second antenna (110A) arranged in or on the ground electrode (30), and a coupling reducing electrode (200) connected to the ground electrode (30) within the slit (33). The slit (33) is formed on a path leading from the first antenna (110) to the second antenna (110A) along the perimeter of the ground electrode. The coupling reducing electrode (200) includes a first conductor (220) having a length corresponding to a first frequency and a second conductor (230) having a length corresponding to a second frequency, which is higher than the first frequency.

20 Claims, 16 Drawing Sheets

(56) References Cited

FOREIGN PATENT DOCUMENTS

| | | | |
|---|---|---|---|
| JP | 2012-244188 | A | 12/2012 |
| JP | 2017-038153 | A | 2/2017 |
| JP | 2017-130770 | A | 7/2017 |

OTHER PUBLICATIONS

Written Opinion for International Patent Application No. PCT/JP2020/002728 dated Apr. 7, 2020.

* cited by examiner

| FREQUENCY [MHz] | | ISOLATION [dB] COMPARATIVE EXAMPLE 1 | ISOLATION [dB] EMBODIMENT 1 |
|---|---|---|---|
| FIRST FREQUENCY (2.4 GHz BAND) | 2400 | 28.3 | 26.5 |
| | 2442 | 29.3 | 32.8 |
| | 2484 | 30.5 | 29.1 |
| SECOND FREQUENCY (5 GHz BAND) | 5150 | 30.2 | 32.1 |
| | 5500 | 31.2 | 27.9 |
| | 5850 | 21.8 | 27.6 |

| FREQUENCY [MHz] | | ISOLATION [dB] | |
|---|---|---|---|
| | | COMPARATIVE EXAMPLE 2 | EMBODIMENT 2 |
| FIRST FREQUENCY (2.4 GHz BAND) | 2400 | 14.6 | 15.8 |
| | 2442 | 15.2 | 16.6 |
| | 2484 | 16.1 | 15.9 |
| SECOND FREQUENCY (5 GHz BAND) | 5150 | 23.0 | 26.8 |
| | 5500 | 23.2 | 28.0 |
| | 5850 | 25.0 | 29.5 |

| FREQUENCY [MHz] | | ISOLATION [dB] | |
|---|---|---|---|
| | | COMPARATIVE EXAMPLE 3 | EMBODIMENT 3 |
| FIRST FREQUENCY (2.4 GHz BAND) | 2400 | 14.7 | 16.5 |
| | 2442 | 15.4 | 17.0 |
| | 2484 | 16.4 | 17.3 |
| SECOND FREQUENCY (5 GHz BAND) | 5150 | 21.9 | 21.7 |
| | 5500 | 22.6 | 22.1 |
| | 5850 | 26.0 | 22.9 |

| FREQUENCY [MHz] | | ISOLATION [dB] | |
|---|---|---|---|
| | | COMPARATIVE EXAMPLE 1 | EMBODIMENT 4 |
| FIRST FREQUENCY (2.4 GHz BAND) | 2400 | 28.3 | 28.9 |
| | 2442 | 29.3 | 30.3 |
| | 2484 | 30.5 | 25.9 |
| SECOND FREQUENCY (5 GHz BAND) | 5150 | 30.2 | 31.0 |
| | 5500 | 31.2 | 39.5 |
| | 5850 | 21.8 | 28.9 |

| FREQUENCY [MHz] | | ISOLATION [dB] | |
|---|---|---|---|
| | | COMPARATIVE EXAMPLE 1 | EMBODIMENT 5 |
| FIRST FREQUENCY (2.4 GHz BAND) | 2400 | 28.3 | 27.2 |
| | 2442 | 29.3 | 31.1 |
| | 2484 | 30.5 | 26.8 |
| SECOND FREQUENCY (5 GHz BAND) | 5150 | 30.2 | 30.0 |
| | 5500 | 31.2 | 44.9 |
| | 5850 | 21.8 | 29.6 |

ANTENNA MODULE AND COMMUNICATION DEVICE INCORPORATING THE SAME

CROSS REFERENCE TO RELATED APPLICATIONS

This is a continuation of International Application No. PCT/JP2020/002728 filed on Jan. 27, 2020 which claims priority from Japanese Patent Application No. 2019-016980 filed on Feb. 1, 2019. The contents of these applications are incorporated herein by reference in their entireties.

BACKGROUND OF THE DISCLOSURE

Field of the Disclosure

The present disclosure relates to an antenna module and a communication device incorporating the antenna module, and more specifically relates to an antenna module that includes a plurality of antennas and provides isolation between the antennas while using the area of a ground electrode effectively.

Description of the Related Art

In an antenna module including two antennas, there is a need to reduce radio wave interference between the antennas. Japanese Unexamined Patent Application Publication No. 2008-283464 (patent document 1) discloses the configuration in which a cut (slit) having a length of ¼ of a wavelength that corresponds to a resonant frequency of each antenna is formed between two antennas arranged at the same side of an electrically conductive layer (ground electrode). Such a configuration enables to hinder a signal from being transmitted from one antenna to another antenna and provide isolation between the antennas.

Patent document 1: Japanese Unexamined Patent Application Publication No. 2008-283464

BRIEF SUMMARY OF THE DISCLOSURE

In recent years, for improvement of communication quality in portable terminals such as smartphones, multiband communications that use signals of a plurality of frequency bands are being used. In communication devices compatible with such multiband communications, there is a need to provide isolation between antennas for signals of the plurality of frequency bands. In the case where isolation is provided by forming a slit such as the one described in the patent document 1, there is a need to form separate slits each corresponding to a frequency band of a signal to be used on a ground electrode. This increases the occupied area of the slits on the ground electrode where the antennas are arranged, and in some cases a constrain may need to be placed on the arrangement of components to be mounted on the ground electrode.

The present disclosure is made to resolve such issues, and an object thereof is to, in an antenna module having a plurality of antennas, provide isolation between the antennas while using the area of a ground electrode effectively.

An antenna module according to a certain aspect of the present disclosure includes a ground electrode in which a first slit is formed in such a manner as to form an opening at a perimeter of the ground electrode, a first antenna and a second antenna arranged in or on the ground electrode, and a coupling reducing electrode connected to the ground electrode within the first slit. The first slit is formed on a path leading from the first antenna to the second antenna along the perimeter of the ground electrode. The coupling reducing electrode includes a first conductor having a length corresponding to a first frequency and a second conductor having a length corresponding to a second frequency, the second frequency being higher than the first frequency.

The antenna module according to the present disclosure enables to hinder a signal from being transmitted from one antenna to the other antenna by causing the coupling reducing electrode, which is provided in the inside of one slit formed between the two antennas, to resonate in response to the two frequencies. Accordingly, it becomes possible to provide isolation between the antennas while using the area of the ground electrode effectively.

DETAILED DESCRIPTION OF THE DISCLOSURE

Figure 1:
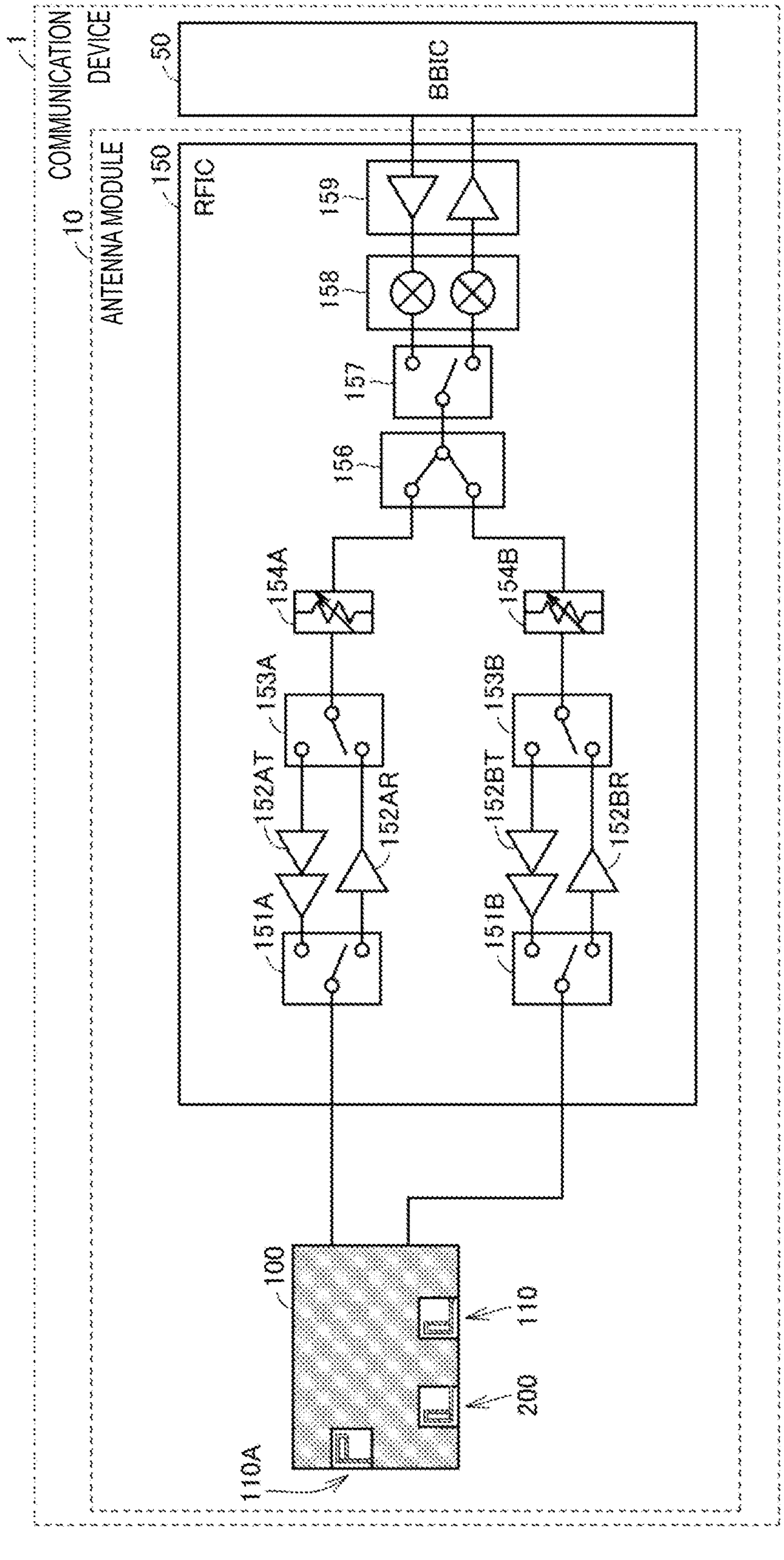
FIG. 1 is a block diagram of a communication device in which an antenna module according to an embodiment 1 is used.

Hereinafter, embodiments of the present disclosure will be described in detail with reference to the drawings. Note that the same reference numerals are assigned to the same or corresponding parts in the drawings, and the description thereof will not be repeated.

Embodiment 1

[Basic Configuration of Communication Device]

FIG. 1 is an example of a block diagram of a communication device 1 incorporating an antenna module 10 according to the embodiment 1. The communication device 1 is, for example, a terminal device such as a mobile phone, a mobile terminal such as a smartphone, a tablet, or the like, or a personal computer with communication function. Examples of frequency bands of radio waves to be used by the antenna module 10 according to the present embodiment include, for example, frequency bands whose center frequencies are near 2.4 GHz (2400 MHz to 2500 MHz) and 5 GHz (5150 MHz to 5800 MHz) which are used for Wi-Fi or Bluetooth (registered trademark). However, a radio wave of a frequency band other than the above may also be used.

Referring to FIG. 1, the communication device 1 includes an antenna module 10 and a BBIC 50 that makes up a baseband signal processing circuit. The antenna module 10 includes an antenna device 100 and a RFIC 150 that is one example of a power feed circuit. The communication device 1 up-converts a signal transmitted from the BBIC 50 to the antenna module 10 into a radio frequency signal and radiates this radio frequency signal from the antenna device 100, and further down-converts a radio frequency signal received by the antenna device 100 and performs processing on the down-converted signal in the BBIC 50.

In the antenna device 100, a plurality of antenna elements (radiation elements) are formed on a substrate. In the example of FIG. 1, two antenna elements 110 and 110A are formed. Furthermore, in the antenna device 100, a low coupling part 200 is formed to hinder a signal from being transmitted from one of the antenna elements to the other antenna element. A detailed configuration of the antenna device 100 will be described below with reference to FIG. 2 to FIG. 4. Note that the "antenna element" in the embodiments corresponds to the "antenna" in the present disclosure.

The RFIC 150 includes switches 151A, 151B, 153A, 153B, and 157, power amplifier 152AT and 152BT, low noise amplifiers 152AR and 152BR, attenuators 154A and 154B, a signal multiplexer/demultiplexer 156, a mixer 158, and an amplifier circuit 159.

When transmitting a radio frequency signal, the switches 151A, 151B, 153A, and 153B are switched to power amplifiers 152AT and 152BT sides, and the switch 157 is connected to a transmitting side amplifier of the amplifier circuit 159. When receiving a radio frequency signal, the switches 151A, 151B, 153A, and 153B are switched to low noise amplifiers 152AR and 152BR sides, and the switch 157 is connected to a receiving side amplifier of the amplifier circuit 159.

A signal transmitted from the BBIC 50 is amplified in the amplifier circuit 159 and up-converted in the mixer 158. A transmitting signal that is an up-converted radio frequency signal is split into two signals in the signal multiplexer/demultiplexer 156, and these two signals are fed to the antenna elements 110 and 110A after traveling through two signal paths.

Received signals that are radio frequency signals received by the respective antenna elements are respectively transmitted via the different signal paths and multiplexed in the signal multiplexer/demultiplexer 156. A multiplexed received signal is down-converted in the mixer 158, amplified in the amplifier circuit 159, and transmitted to the BBIC 50.

The RFIC 150 is formed as, for example, a one-chip integrated circuit component including the foregoing circuit configuration. Alternatively, for each antenna element, devices (switch, power amplifier, low noise amplifier, and attenuator) corresponding to each antenna element in the RFIC 150 may be formed as a one-chip integrated circuit component.

(Configuration of Antenna Device)

Figure 2:
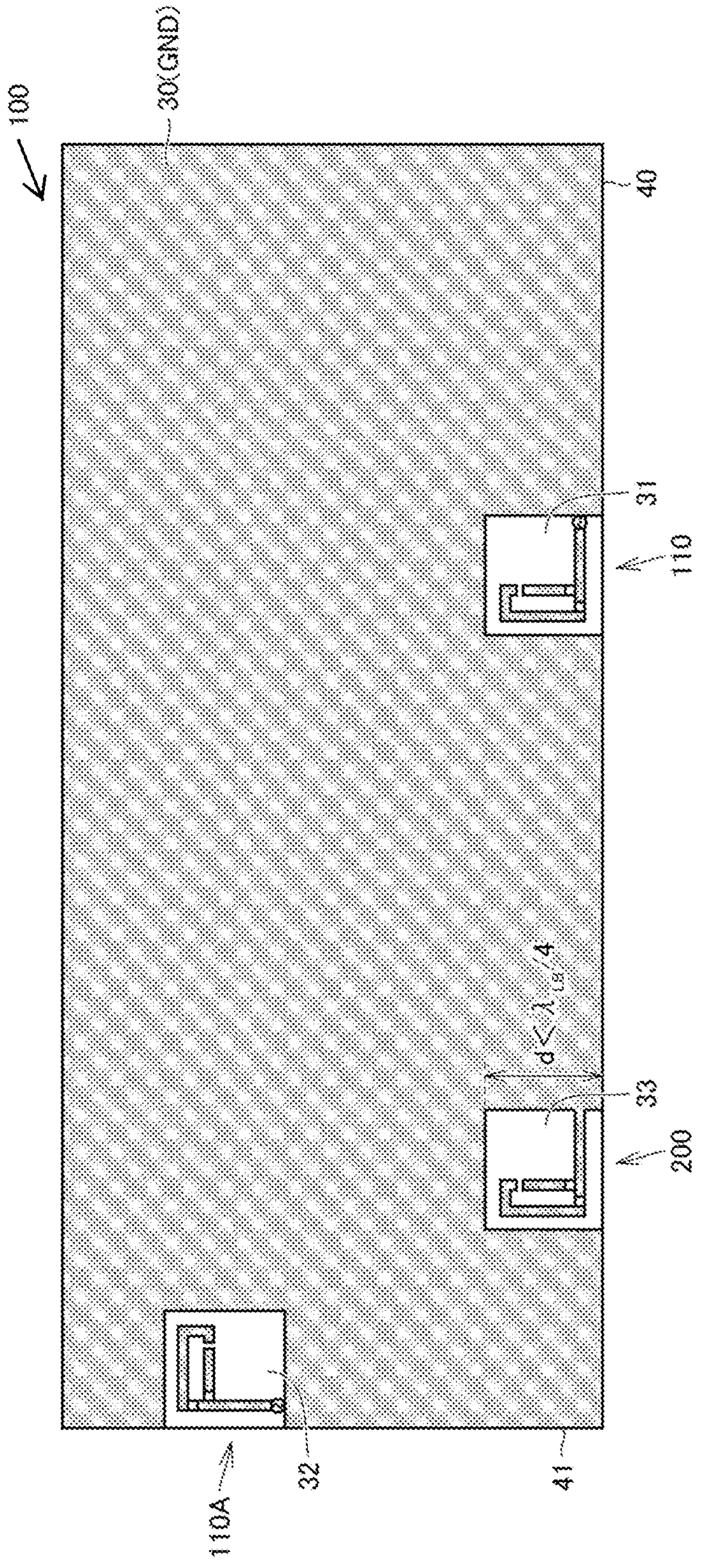
FIG. 2 is a plan view of an antenna device according to the embodiment 1.
Figure 3:
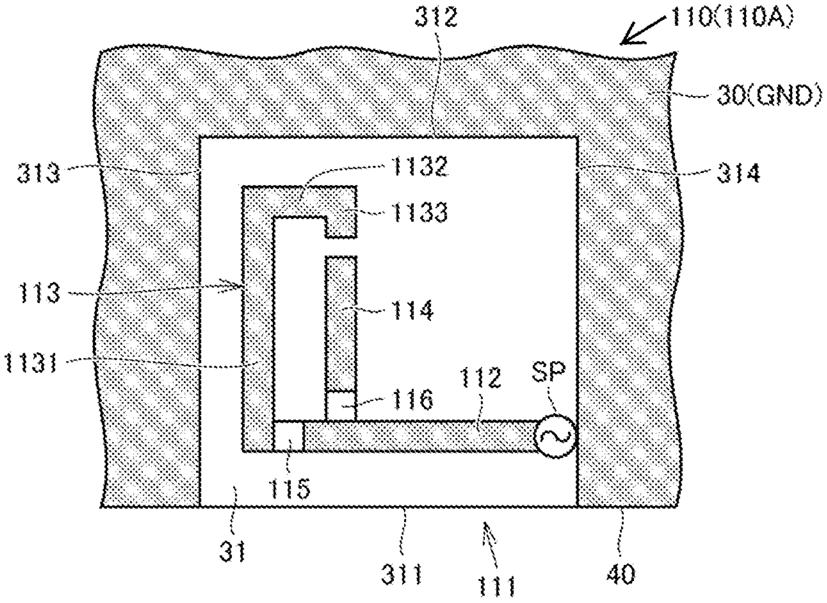
FIG. 3 is a diagram illustrating details of structure of an antenna element of FIG. 2.

Using FIG. 2 to FIG. 4, a detailed configuration of the antenna device 100 will be described. FIG. 2 is a plan view of the antenna device 100 of FIG. 1. FIG. 3 is a diagram illustrating a detailed structure of the antenna element 110 (110A), and FIG. 4 is a diagram illustrating a detailed structure of the low coupling part 200.

Figure 4:
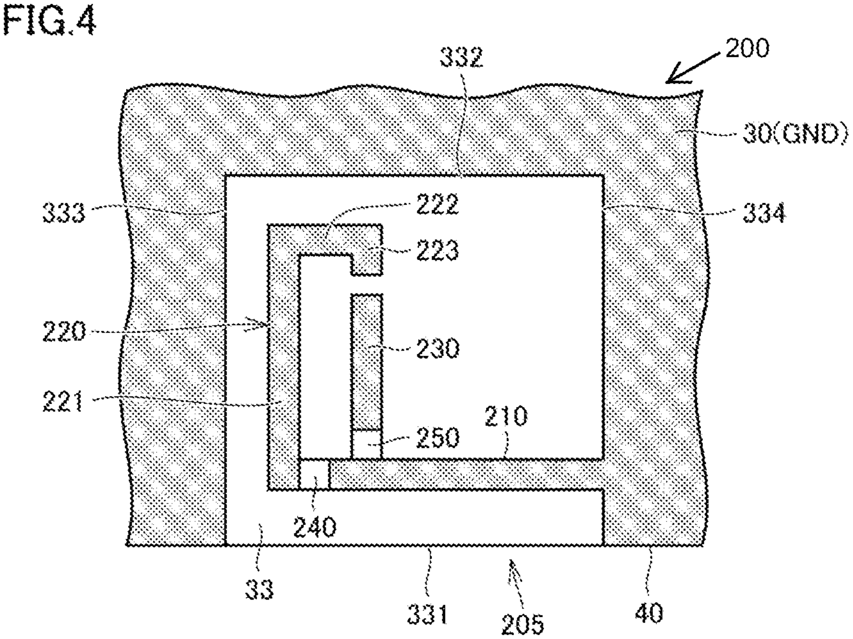
FIG. 4 is a diagram illustrating details of structure of a low coupling part of FIG. 2.

Referring to FIG. 2 to FIG. 4, the antenna device 100 includes a conductor part 30 that makes up a substrate. The conductor part 30 has, for example, a configuration in which an electrically conductive material such as copper or the like is placed on a resin substrate and functions as a ground electrode GND. The conductor part 30 has a substantially rectangular shape and has a side 40 and a side 41 that are arranged adjacent to each other. In the antenna device 100 of the embodiment 1, the antenna element 110 is formed at the side 40, and the antenna element 110A is formed at the side 41. Furthermore, the low coupling part 200 is formed on a path leading from the antenna element 110 to the antenna element 110A along the side 40 and the side 41. In FIG. 2, the low coupling part 200 is formed at the side 40. In other words, the low coupling part 200 is formed on a shorter segment of the path leading from the antenna element 110 to the antenna element 110A along the perimeter of the conductor part 30 that functions as the ground electrode GND.

In the embodiment 1, the antenna elements 110 and 110A are so-called notch antennas and function as antennas by receiving supply of a radio frequency signal at radiation electrodes 111 arranged inside slits 31 and 32 whose openings are formed along the circumference of the conductor part 30.

FIG. 3 is a diagram illustrating a detail structure of the antenna element 110. Note that this configuration is similar to that of the antenna element 110A, and thus a detailed description thereof will not be repeated.

Referring to FIG. 3, the slit 31 has an opening formed along the side 40 of the conductor part 30. In the following description, this opening part along a side of the conductor part 30 in the slit, whose opening is formed at the perimeter of the conductor part 30 (ground electrode), is sometimes referred to as an "open end part". The slit 31 faces an open end part 311 and has a close end part 312 on the inner side of the conductor part 30 than the open end part 311. Furthermore, the slit 31 has side end parts 313 and 314 that face each other between the open end part 311 and the close end part 312.

The antenna element 110 includes, within the slit 31 described above, a conductor pattern, frequency adjustment elements 115 and 116, and a power feed part SP. Note that the configuration formed from the conductor pattern and the frequency adjustment elements corresponds to the "radiation electrode 111" described above.

The conductor pattern is formed on the resin substrate, on which the conductor part 30 is formed, using an electrically conductive material such as copper or the like. Note that the conductor pattern may alternatively be formed by patterning the conductor part 30 using etching or the like. The conductor pattern is electrically insulated from the conductor part 30.

The conductor pattern is configured to include a common conductor 112, a first conductor 113, and a second conductor 114. The common conductor 112 extends in parallel to the side 40 on the open end part 311 side of the slit 31 in the direction from the side end part 314 to the side end part 313. One end portion of the common conductor 112 is connected to one end portion of the first conductor 113 with the frequency adjustment element 115 interposed therebetween. Furthermore, the power feed part SP is arranged between the other end portion of the common conductor 112 and the side end part 314.

The first conductor 113 includes a first part 1131 extending along the side end part 313 and a second part 1132 that is connected to an end part of the first part 1131 at one end portion thereof and extends along the close end part 312 in the direction from the side end part 313 to the side end part 314. Furthermore, the first conductor 113 further includes a third part 1133 that is connected to an end part of the second part 1132 at one end portion thereof and extends along the side end part 314 in the direction from the close end part 312 to the open end part 311. The other end portion of the third part 1133 forms an open end. That is to say, the first conductor 113 is formed in an angular J shape.

The second conductor 114 extends in parallel to the first conductor 113 in the direction from the open end part 311 to the close end part 312. One end portion of the second conductor 114 is connected to the common conductor 112 with the frequency adjustment element 116 interposed therebetween. The other end portion of the second conductor 114 forms an open end and faces the open end of the third part 1133 of the first conductor 113.

The power feed part SP is connected to the RFIC 150 of FIG. 1 and supplies a radio frequency signal from the RFIC 150 to the radiation electrode 111. The frequency adjustment element is, for example, a chip element configured to include an inductor and/or a capacitor.

Each of the common conductor 112, the first conductor 113, and the second conductor 114, which make up the conductor pattern, functions as an inductor. The conductor pattern forms a capacitor with the conductor part 30 facing thereto. Furthermore, a capacitor is formed between the open end of the first conductor 113 and the open end of the second conductor 114 facing thereto. At the open ends of the first conductor 113 and the second conductor 114, the intensity of electric field becomes stronger compared with the other parts, and by arranging both the open ends opposite each other, it becomes possible to increase a capacitance efficiently.

In a part formed from the common conductor 112, the frequency adjustment element 115, and the first conductor 113, inductances and capacitances of respective parts are adjusted in such a way that the part resonates at a first frequency (for example, 2.4 GHz) supplied from the RFIC 150. Furthermore, in a part formed from the common conductor 112, the frequency adjustment element 116, and the second conductor 114, inductances and capacitances of respective parts are adjusted in such a way that the part resonates at a second frequency (for example, 5 GHz) supplied from the RFIC 150.

At that time, the frequency adjustment element 115 is configured in such a way that the impedance of the first conductor 113 looking from the power feed part SP is lower than the impedance of the second conductor 114 looking from the power feed part SP at the first frequency. Furthermore, the frequency adjustment element 116 is configured in such a way that the impedance of the second conductor 114 looking from the power feed part SP is lower than the impedance of the first conductor 113 looking from the power feed part SP at the second frequency.

With such configuration, when a signal of the first frequency is supplied from the power feed part SP, the frequency adjustment element 115 allows the signal of the first frequency to pass, but the frequency adjustment element 116 hinders the passing of the signal of the first frequency. On the other hand, when a signal of the second frequency is supplied from the power feed part SP, the frequency adjustment element 116 allows the signal of the second frequency to pass, but the frequency adjustment element 115 hinders the passing of the signal of the second frequency. That is to say, the frequency adjustment element 115 and the frequency adjustment element 116 each function as a filter that selectively allows a signal of a predetermined frequency to pass. This allows the antenna element 110 to function as a so-called dual-band type antenna capable of radiating a signal of the first frequency and a signal of the second frequency.

In a notch antenna, in general, a radio wave is radiated by supplying a radio frequency signal to a slit whose slit length (length of a side end part) is ¼ of a wavelength λ corresponding to the radio wave to be radiated. By arranging the radiation electrode such as illustrated in FIG. 3 within the slit, it becomes possible to shorten the slit length.

Note that in FIG. 3, the frequency adjustment elements 115 and 116 are not essential constituent elements. In the case where impedances of respective parts can be adjusted in such a way that two radio frequency signals are selectively supplied to the first conductor 113 and the second conductor 114, one of the frequency adjustment elements 115 and 116 or both may be omitted.

FIG. 4 is a diagram illustrating details of structure of the low coupling part 200 of FIG. 2. The low coupling part 200 has a configuration in which a coupling reducing electrode 205 is arranged inside a slit 33 having an open end part 331, a close end part 332, and side end parts 333 and 334.

The coupling reducing electrode 205 is made up of a conductor pattern including a common conductor 210, a first conductor 220, and a second conductor 230, and frequency adjustment elements 240 and 250. The coupling reducing electrode 205 has substantially the same configuration as that of the antenna element 110 or 110A described using FIG. 3 but is different therefrom in that the common conductor 210 is connected to the conductor part 30.

That is to say, the common conductor 210 extends in parallel to the side 40 on the open end part 331 side of the slit 33 in the direction from the side end part 334 to the side end part 333. One end portion of the common conductor 210 is connected to one end portion of the first conductor 220 with the frequency adjustment element 240 interposed therebetween. The other end portion of the common conductor 210 is connected to the conductor part 30.

The first conductor 220 includes a first part 221 extending along the side end part 333 and a second part 222 that is connected to an end part of the first part 221 at one end portion thereof and extends along the close end part 332 in the direction from the side end part 333 to the side end part 334. Furthermore, the first conductor 220 further includes a third part 223 that is connected to an end part of the second part 222 at one end portion thereof and extends along the side end part 334 in the direction from the close end part 332 to the open end part 331. The other end portion of the third part 223 forms an open end. That is to say, the first conductor 220 is formed in an angular J shape.

The second conductor 230 extends in parallel to the first conductor 220 in the direction from the open end part 331 to the close end part 332. One end portion of the second conductor 230 is connected to the common conductor 210 with the frequency adjustment element 250 interposed therebetween. The other end portion of the second conductor 230 forms an open end and faces the open end of the third part 223 of the first conductor 220.

In the coupling reducing electrode 205, inductances and capacitances of respective parts are adjusted in such a way that a resonant frequency of a part formed from the common conductor 210, the frequency adjustment element 240, and the first conductor 220 becomes equal to the first frequency (2.4 GHz). Furthermore, inductances and capacitances of respective parts are adjusted in such a way that a resonant frequency of a part formed from the common conductor 210, the frequency adjustment element 250, and the second conductor 230 becomes equal to the second frequency (5 GHz).

Note that also in the coupling reducing electrode 205, the frequency adjustment elements 240 and 250 are not essential constituent elements. In the case where impedances of respective parts can be adjusted in such a way that the first conductor 220 and the second conductor 230 are respectively selected in response to two radio frequency signals, one of the frequency adjustment elements 240 and 250 or both may be omitted.

With such configuration, a current having the first frequency and a current having the second frequency that flow along the side 40 of the conductor part 30 where the slit 33 is formed are cancelled at the open end part 331 of the slit 33. That is to say, the low coupling part 200 functions as a filter that blocks a signal of a specific frequency band and hinders a signal from being transmitted from one of the antenna elements to the other antenna element when a signal of the first frequency and a signal of the second frequency are supplied to the antenna elements 110 and 110A. Accordingly, the low coupling part 200 enables to provide isolation between the antenna elements 110 and 110A.

In an antenna module including a plurality of antenna elements, for prevention of interference of signals between two antenna elements (for providing isolation), a configuration is known in which a slit having a length of ¼ of wavelength of a radio frequency signal to be radiated is formed in a ground electrode between the antenna elements. In such configuration, when signals of a plurality of frequency bands are to be radiated from the antenna elements, there is a need to form separate slits corresponding to the respective ones of the plurality of frequency bands in the ground electrode. This increases the occupied area of the slits in the ground electrode where the antenna elements are arranged and may sometimes place a constraint on the arrangement of components to be mounted on the ground electrode.

In the antenna module according to the present embodiment 1, the coupling reducing electrode is formed inside the slit whose opening is formed along the perimeter of the ground electrode wherein the coupling reducing electrode is configured to resonate at frequency bands corresponding to two signals to be radiated from the antenna elements, and this hinders a signal from being transmitted from one of the antenna elements to the other antenna element. With such configuration, compared with the case where the slits corresponding to two signals to be radiated are formed separately such as the case described above, it becomes possible to provide greater or equal isolation in the ground electrode using a less occupied area.

Next, isolation between the antenna elements is compared in the case where the slits are separately formed (comparative example 1) and in the case of the configuration of the embodiment 1.

Figure 5:
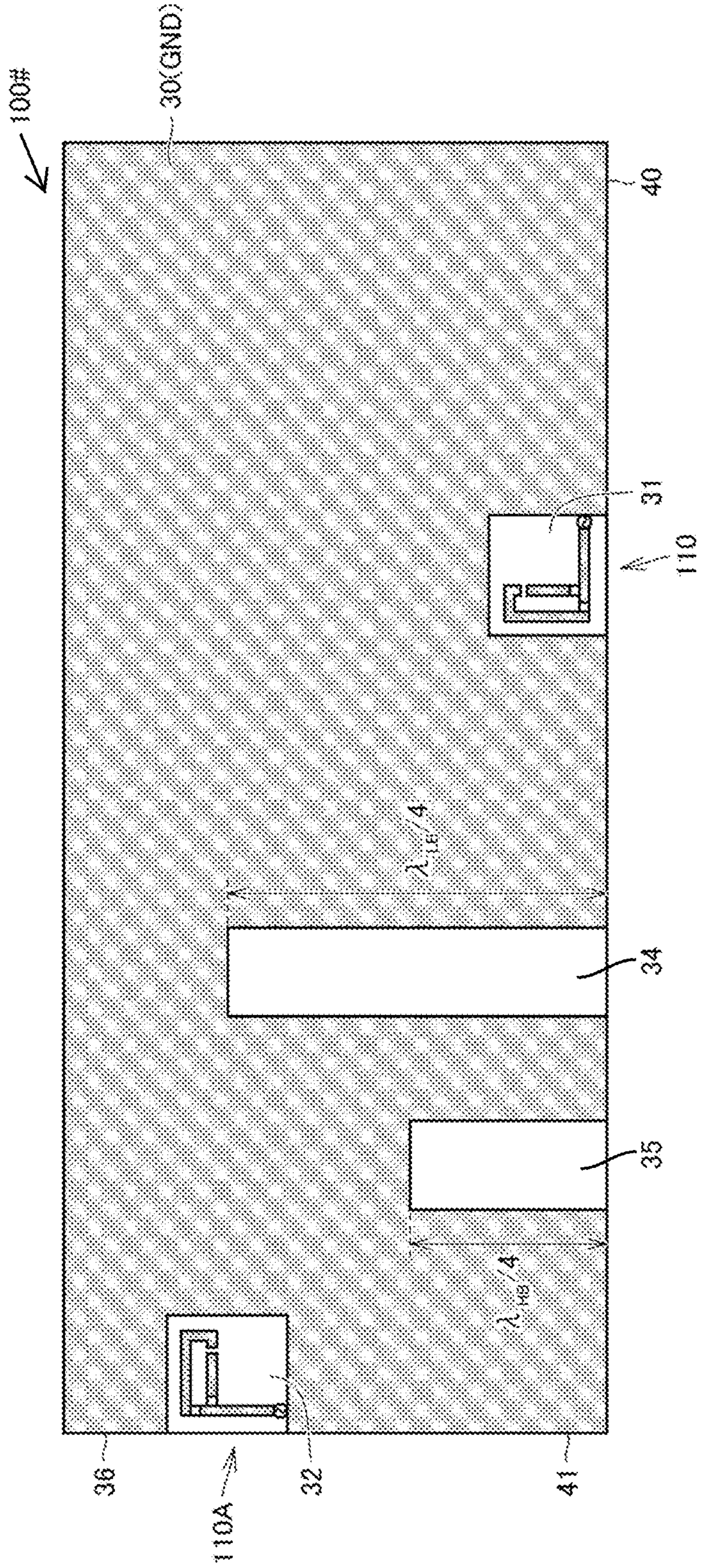
FIG. 5 is a plan view of an antenna device of a comparative example 1.

FIG. 5 is a plan view of an antenna device 100# of the comparative example 1. In the antenna device 100#, instead of the low coupling part 200 of the embodiment 1, two slits 34 and 35 are formed in the conductor part 30. The length of the slit 34 (slit length) from an open end part to a close end part is equal to ¼ of a wavelength $\lambda_{LB}$ corresponding to the first frequency on the lower frequency side of radio waves to be radiated from the antenna elements 110 and 110A. This causes currents that flow between the end parts of the conductor part 30 at the open end part of the slit 34 to have the opposite phases. As a result, the currents flowing the conductor part 30 along the side 40 cancel each other out, and it becomes possible to hinder a radio frequency signal of the first frequency from being transmitted from one of the antenna elements to the other antenna element. Furthermore, in the slit 35, the slit length is set to ¼ of a wavelength $\lambda_{HB}$ corresponding to the second frequency on the higher frequency side. As is the case with the slit 34, this enables to hinder a radio frequency signal of the second frequency from being transmitted from one of the antenna elements to the other antenna element.

In this way, the antenna device 100# having the configuration including the slits 34 and 35 like the comparative example 1 also functions similarly to the low coupling part 200 of the embodiment 1. However, as it is clear from the comparison between FIG. 2 and FIG. 5, in the comparative example 1, the cut area of the conductor part 30 becomes larger compared with the configuration of the embodiment 1. This limits flexibility in arrangement of various components on the conductor part 30 that serves as the ground electrode GND and may become a factor in preventing downsizing of an antenna module and a communication device.

In the configuration such as the low coupling part 200 in the embodiment 1, only one slit 33 is formed for two frequencies, the first frequency and the second frequency, and furthermore, by adjusting inductances and capacitances using the coupling reducing electrode 205 arranged inside the slit 33, it becomes possible to reduce the slit length d of the slit 33 to at least less than ¼ of the wavelength $\lambda_{LB}$ corresponding to the first frequency on the lower frequency side ($d<\lambda_{LB}/4$). Accordingly, by employing the configuration of the low coupling part such as the one in the embodiment 1, it becomes possible to provide isolation between the antenna elements while using the area of the ground electrode (conductor part 30) effectively.

Figures 6, 7:
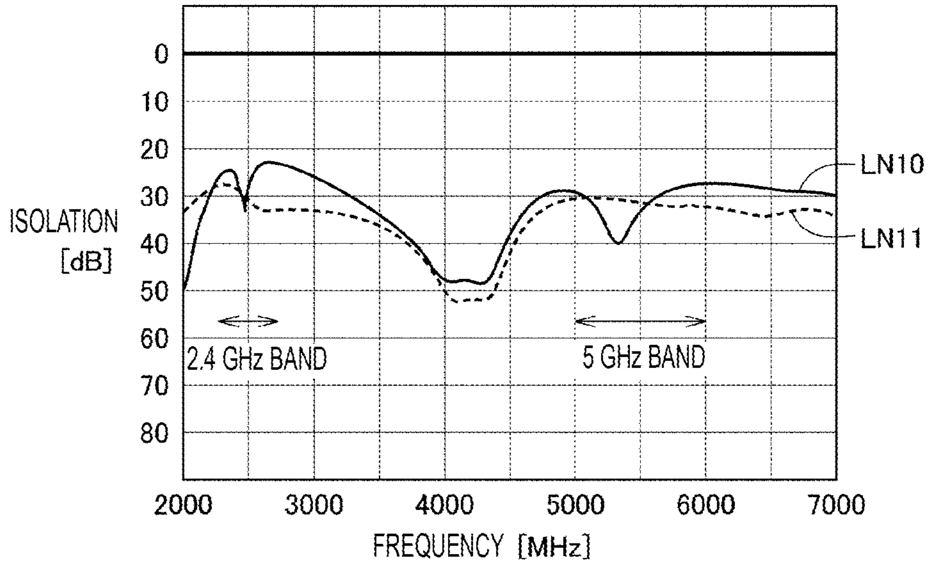
FIG. 6 is a first diagram for illustrating isolation between antenna elements of the antenna devices in the embodiment 1 and the comparative example 1.
FIG. 7 is a second diagram for illustrating isolation between antenna elements of the antenna devices in the embodiment 1 and the comparative example 1.

FIG. 6 and FIG. 7 are diagrams for illustrating isolation between the antenna elements in the antenna device 100 of the embodiment 1 and the antenna device 100# of the comparative example 1. FIG. 6 is a graph illustrating the change in isolation with respect to frequency, and the horizontal axis represents the frequency and the vertical axis represents the isolation. FIG. 7 is a table illustrating the isolation in two target frequency bands (2.4 GHz band and 5 GHz band) in numerical values. Note that in FIG. 6, a solid line LN10 denotes isolation in the case of the embodiment 1, and a dashed line LN11 denotes isolation in the case of the comparative example 1.

As illustrated in FIG. 6 and FIG. 7, in the target bands of the first frequency (2.4 GHz band) and the second frequency (5 GHz band), it is found that greater or equal isolation is provided in the case of the low coupling part 200 of the embodiment 1 compared with the case of the comparative example 1. That is to say, by using the configuration such as the low coupling part 200 of the embodiment 1, it becomes possible to provide greater or equal isolation using a less occupied area in the conductor part 30. This enables effective use of the area of the conductor part 30 and further the contribute to the size reduction of an antenna device.

Embodiment 2

In the embodiment 1, there is described the exemplary case where two antenna elements are notch antennas. However, the antenna element formed in or on the conductor part may have a configuration other than that of the notch antenna.

In the embodiment 2, there will be described an exemplary case where at least one of the antenna elements has a configuration different from that of the notch antenna.

Figure 8:
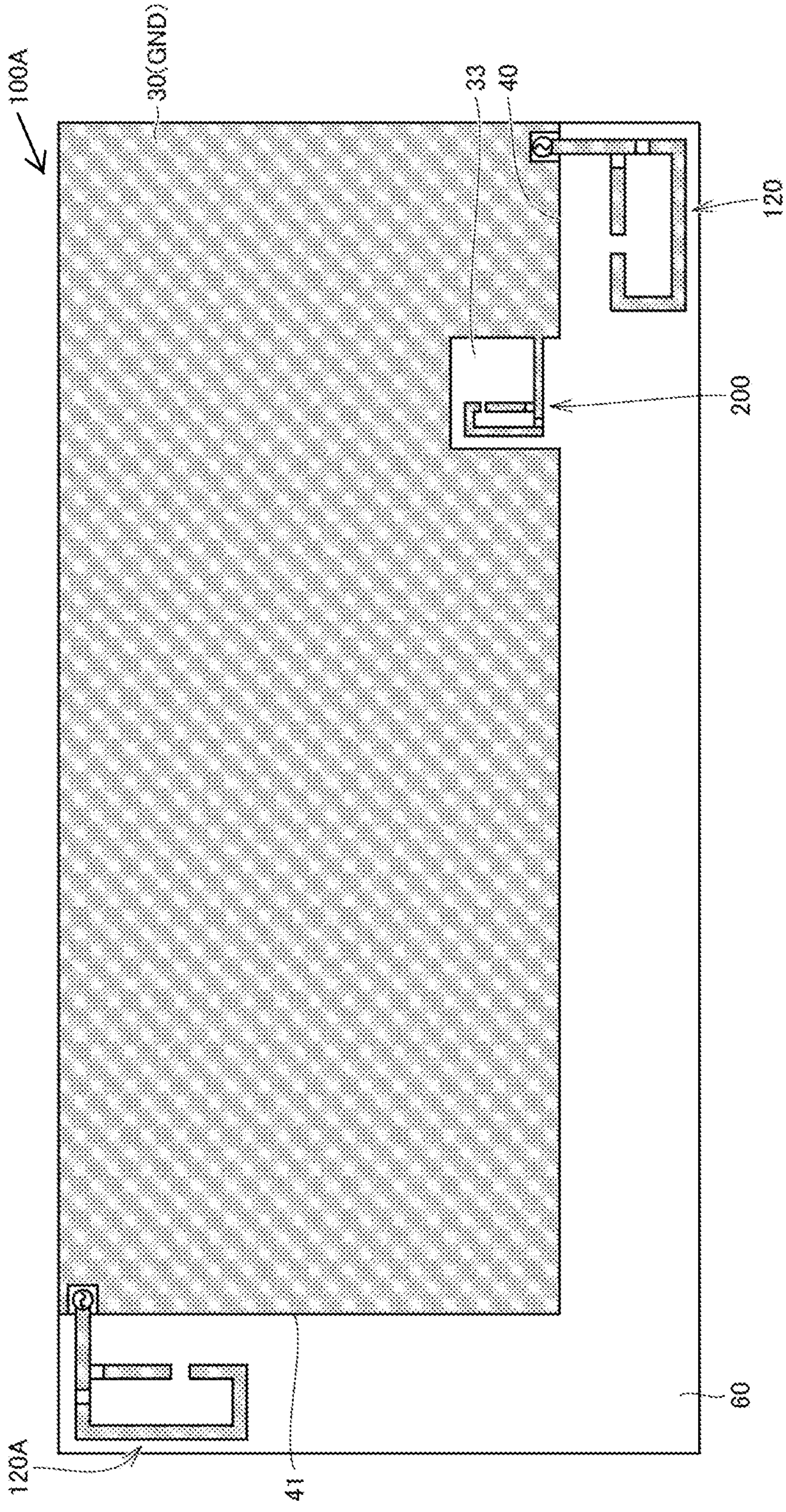
FIG. 8 is a plan view of an antenna device according to an embodiment 2.

FIG. 8 is a plan view of an antenna device 100A according to the second embodiment. Referring to FIG. 8, instead of the antenna elements 110 and 110A which are the notch antennas in the embodiment 1, antenna elements 120 and 120A that are formed as line-like antennas are arranged in the antenna device 100A.

In the antenna device 100A, parts of a resin substrate 60 at the sides 40 and 41 of the conductor part 30 are made larger than a conductor part. In this part of the resin substrate 60, a conductor pattern that makes up the antenna element 120 is formed at the side 40, and a conductor pattern that makes up the antenna element 120A is formed at the side 41.

In the example of FIG. 8, each of the antenna elements 120 and 120A is a monopole antenna capable of radiating radio waves of two frequency bands (first frequency and second frequency). Each of the antenna elements 120 and 120A has in outline a configuration similar to that of the radiation electrode provided inside the slit of the notch antenna of the embodiment 1, and the first conductor corresponding to the first frequency and the second conductor corresponding to the second frequency are connected to the common conductor with the frequency adjustment elements interposed therebetween, respectively. A radio frequency signal is supplied to the common conductor from the RFIC 150 via the power feed part.

Figure 9:
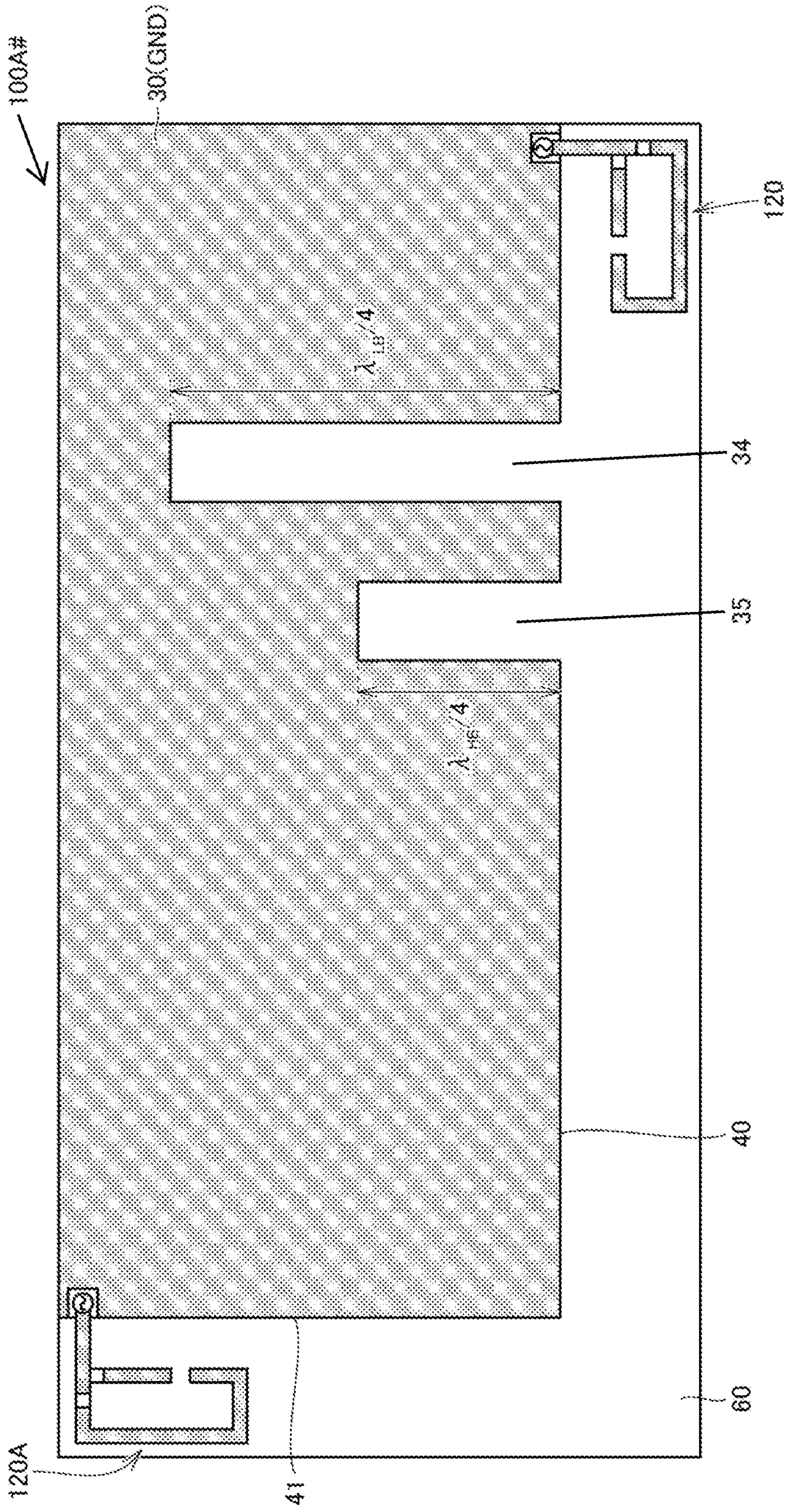
FIG. 9 is a plan view of an antenna device of a comparative example 2.

FIG. 9 is a plan view of an antenna device 100A# of a comparative example 2. As is the case with the comparative example 1, the antenna device 100A# has a configuration in which the low coupling part 200 of the antenna device 100A of FIG. 8 is replaced with two slits 34 and 35.

Figures 10, 11:
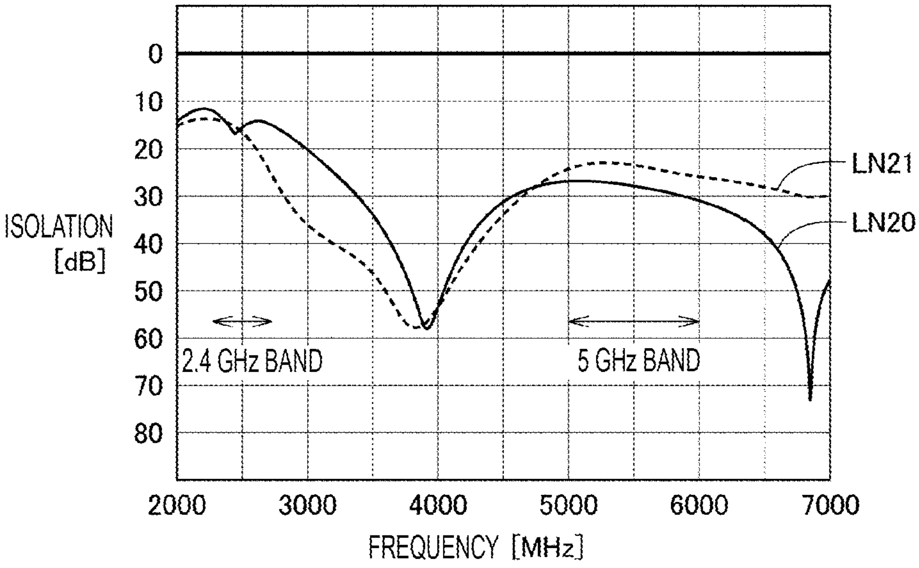
FIG. 10 is a first diagram for illustrating isolation between antenna elements of the antenna devices in the embodiment 2 and the comparative example 2.
FIG. 11 is a second diagram for illustrating isolation between antenna elements of the antenna devices in the embodiment 2 and the comparative example 2.

FIG. 10 and FIG. 11 are diagrams for illustrating isolation between the antenna elements in the antenna device 100A of the embodiment 2 and the antenna device 100A# of the comparative example 2. With regard to FIG. 10 and FIG. 11, as is the case with FIG. 6 and FIG. 7 of the embodiment 1, FIG. 10 illustrates a graph illustrating the change in isolation with respect to frequency, and FIG. 11 illustrates the isolation in two target frequency bands in numerical values. Note that in FIG. 10, a solid line LN20 denotes the result in the case of the embodiment 2, and a dashed line LN21 denotes the result in the case of the comparative example 2.

As illustrated in FIG. 10 and FIG. 11, in both the target frequency bands of 2.4 GHz band and 5 GHz band, greater or equal isolation is provided in the case of the low coupling part 200 of the embodiment 2 compared with the case of the comparative example 2.

Figure 12:
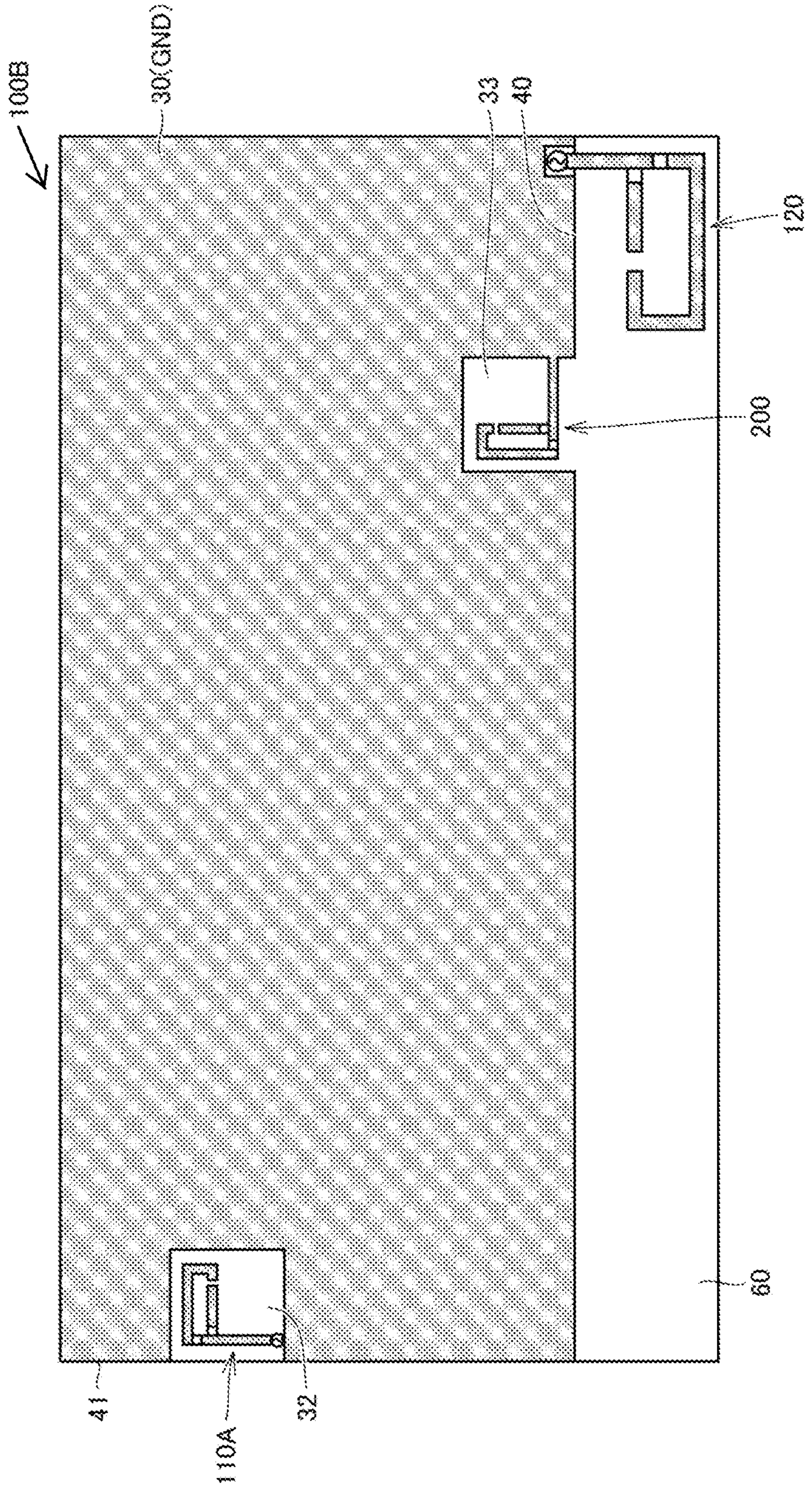
FIG. 12 is a plan view of an antenna device of a modified example 1.

As described above, the function of the low coupling part illustrated in the embodiment 1 and the embodiment 2 does not depend on the configuration of the antenna element in the antenna device. Accordingly, for example, as in an antenna device 100B of a modified example 1 illustrated in FIG. 12, a configuration in which one of the two antenna elements is formed as a notch antenna and the other antenna element is formed as a line-like antenna may also be employed.

Embodiment 3

In the embodiment 1 and the embodiment 2, the configuration is described in which two antenna elements are respectively arranged at different sides of the conductor part (ground electrode) that are adjacent to each other.

In the embodiment 3, there will be described an exemplary configuration in which two antenna elements are arranged at the same side of the conductor part.

Figure 13:
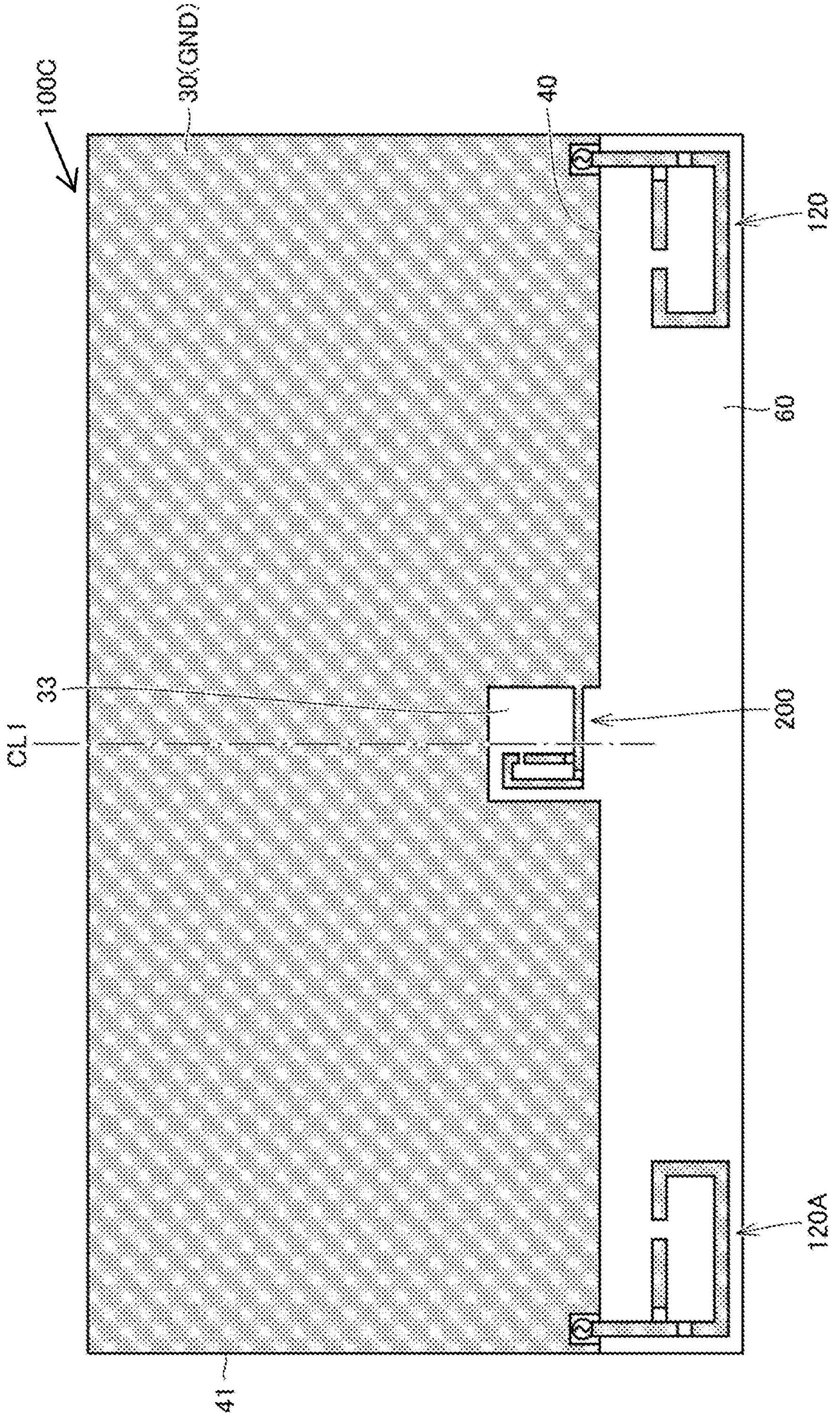
FIG. 13 is a plan view of an antenna device according to an embodiment 3.

FIG. 13 is a plan view of an antenna device 100C according to the embodiment 3. The antenna device 100C has a configuration in which the antenna element 120A, which is arranged at the side 41 in the embodiment 2, is arranged at the same side 40 as the antenna element 120. The antenna element 120 is arranged in one of the end parts of the side 40, and the antenna element 120A is arranged in the other end part of the side 40. Furthermore, the antenna element 120 and the antenna element 120A are arranged in such a manner as to be symmetric about a hypothetical line CL1 that passes through the center of the side 40.

The low coupling part 200 is formed at the side 40 between the antenna element 120 and the antenna element 120A. Note that in the example of FIG. 13, the low coupling part 200 is arranged in a center part of the side 40.

Note that in FIG. 13, there is described the exemplary case where two antenna elements are line-like antennas. However, the configuration of the antenna elements are not limited thereto. Alternatively, two antenna elements may be notch antennas as in the embodiment 1, or one of the antenna elements may be a notch antenna and the other antenna element may be a line-like antenna as in the modified example 1 of FIG. 12.

Figure 14:
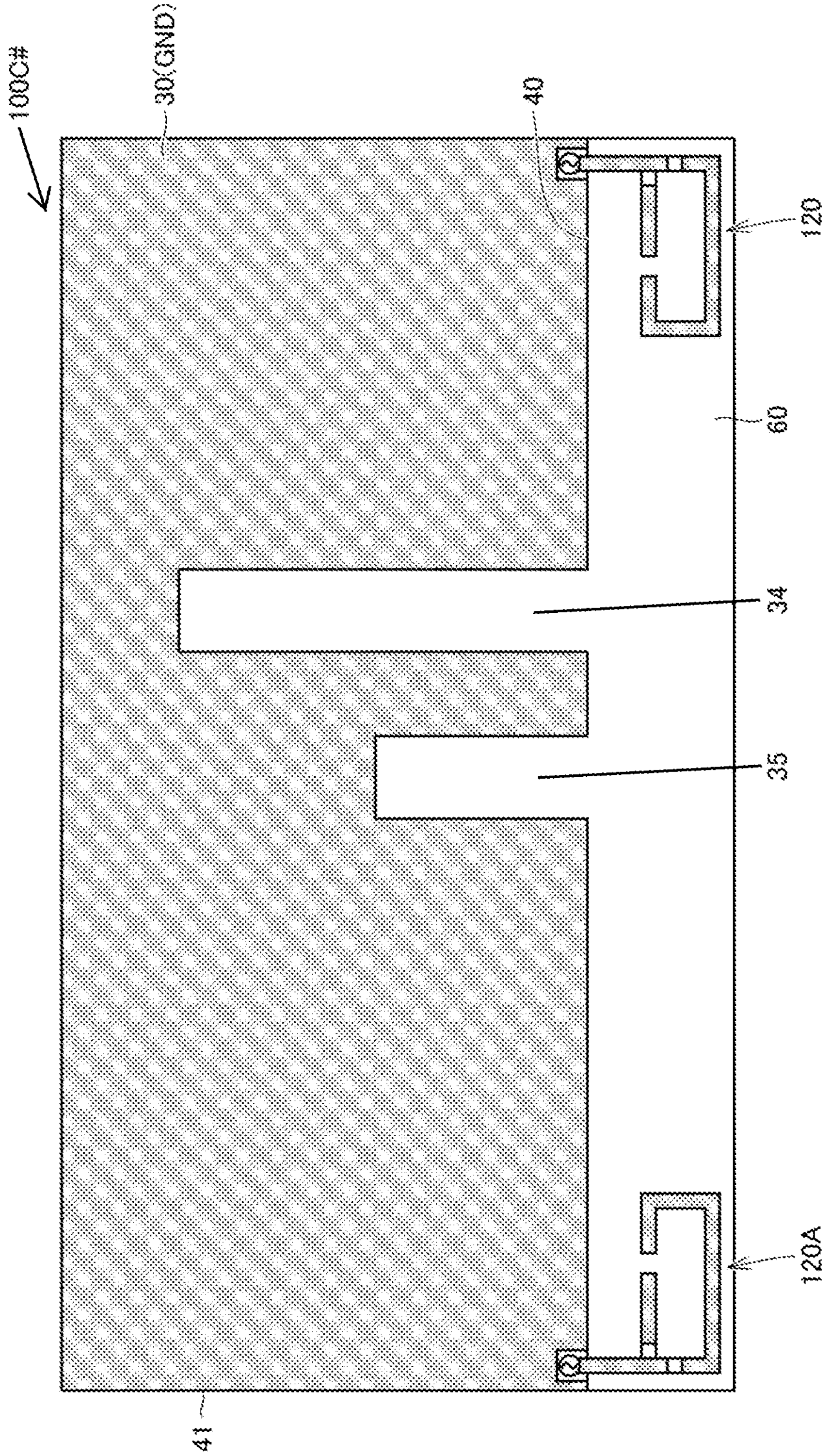
FIG. 14 is a plan view of an antenna device of a comparative example 3.

FIG. 14 is a plan view of an antenna device 100C# of a comparative example 3. The antenna device 100C# has a configuration in which the low coupling part 200 of the antenna device 100C of FIG. 13 is replaced with two slits 34 and 35.

Figures 15, 16:
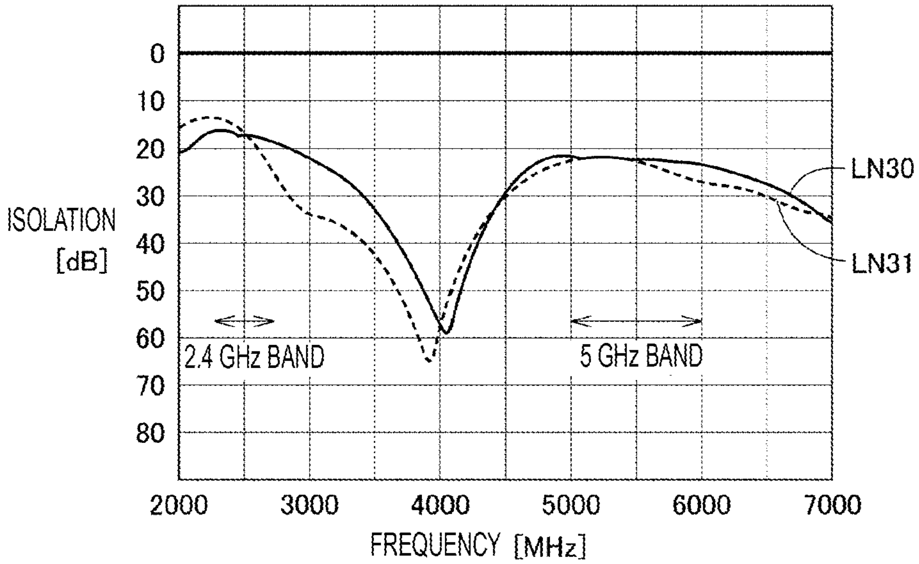
FIG. 15 is a first diagram for illustrating isolation between antenna elements of the antenna devices in the embodiment 3 and the comparative example 3.
FIG. 16 is a second diagram for illustrating isolation between antenna elements of the antenna devices in the embodiment 3 and the comparative example 3.

FIG. 15 and FIG. 16 are diagrams for illustrating isolation between the antennas in the antenna device 100C of the embodiment 3 and the antenna device 100C# of the comparative example 3. FIG. 15 illustrates a graph illustrating the change in isolation with respect to frequency, and FIG. 16 illustrates the isolation in two target frequency bands in numerical values. Note that in FIG. 15, a solid line LN30 denotes the result in the case of the embodiment 3, and a dashed line LN31 denotes the result in the case of the comparative example 3.

As illustrated in FIG. 15 and FIG. 16, in both the target frequency bands of 2.4 GHz band and 5 GHz band, greater or equal isolation is provided in the case of the low coupling part 200 of the embodiment 3 compared with the case of the comparative example 3.

Figure 17:
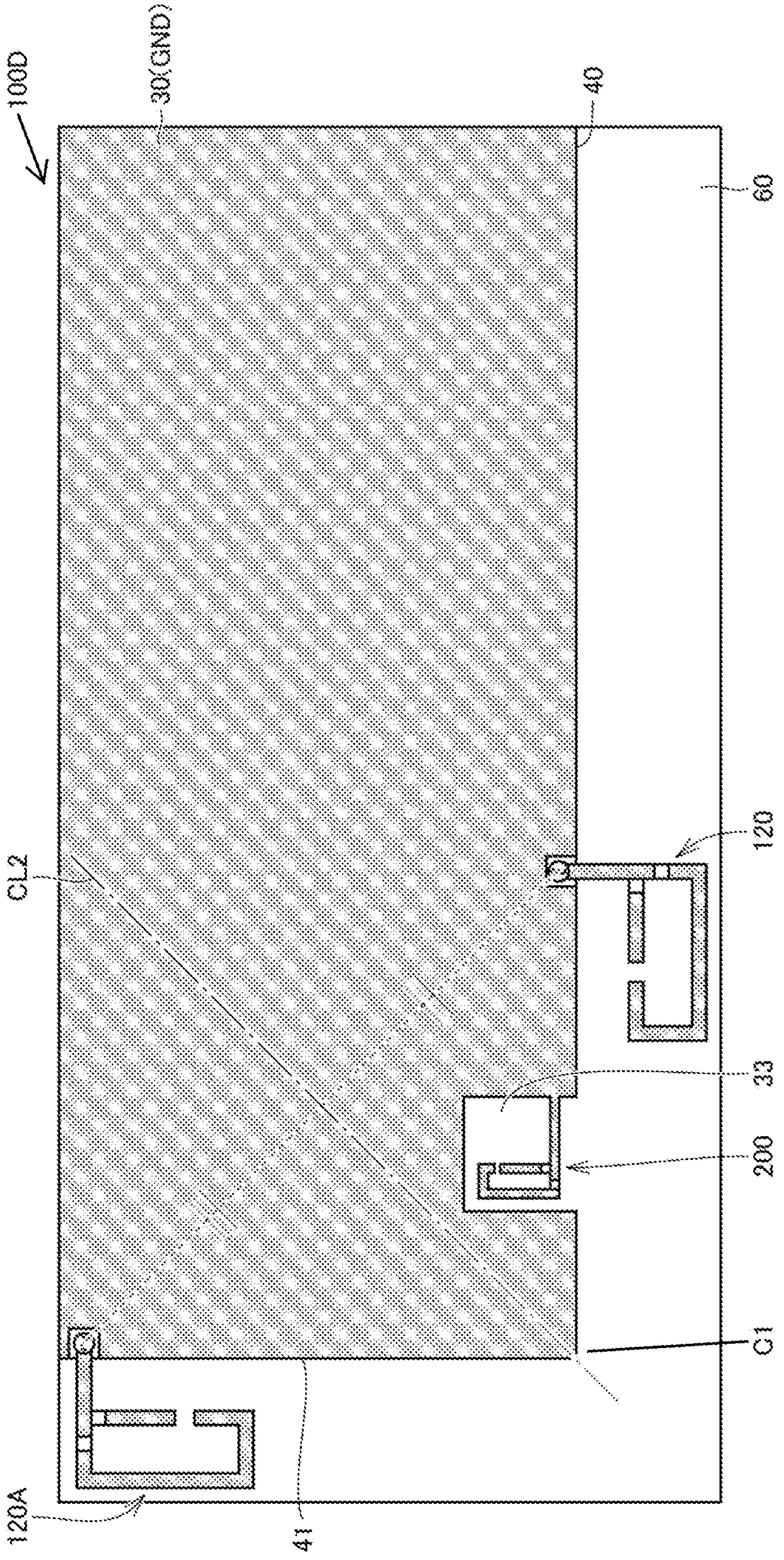
FIG. 17 is a plan view of an antenna device of a modified example 2.

Note that in FIG. 13, the example is illustrated in which two antenna elements, which are formed at the same side of the conductor part having a rectangular shape, are arranged symmetrically with respect to the conductor part (ground electrode). However, as in the embodiment 1 and the embodiment 2, in the case where the antenna element is arranged at each of two adjacent sides, two antenna elements may be arranged symmetrically with respect to a corner part where two sides are connected. Specifically, as in an antenna device 100D of a modified example 2 illustrated in FIG. 17, a configuration may alternatively be used in which the antenna element 120 and the antenna element 120A are arranged symmetrically about a hypothetical line CL2 that divides a corner part C1, where the side 40 and the side 41 are connected, into two halves.

Embodiment 4

In the embodiments 2 and 3 described above, the examples that use different arrangements of the antenna elements are described. In the following embodiment 4, a different configuration of the coupling reducing electrode of the low coupling part 200 will be described. Note that an antenna device of the embodiment 4 has the configuration of the antenna device 100 of the embodiment 1 illustrated in FIG. 2 as the base configuration, and only the configuration of the coupling reducing electrode 205 of the low coupling part 200 is modified. Accordingly, in the embodiment 4, only the configuration of the low coupling part in the antenna device is described, and the description regarding the remaining configuration will not be repeated.

First Example

Figure 18:
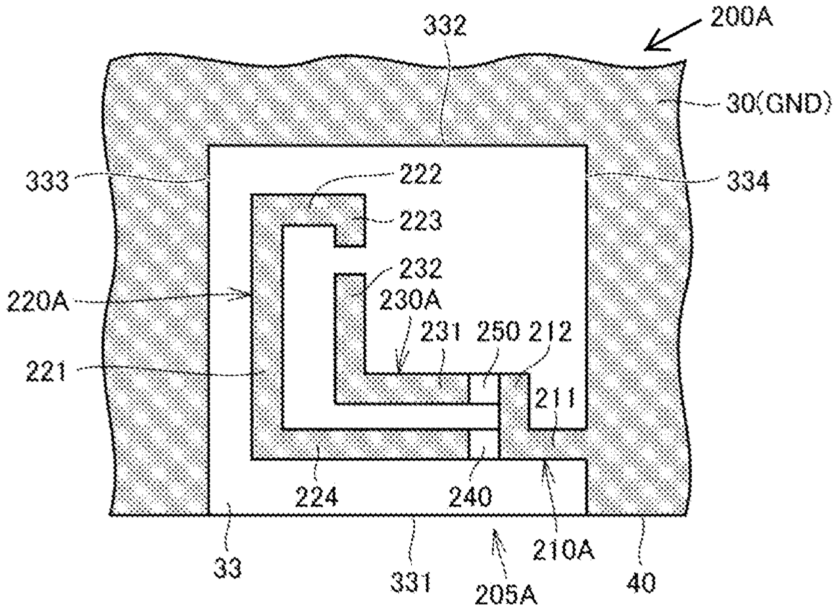
FIG. 18 is a diagram illustrating a low coupling part in a first example of an embodiment 4.

FIG. 18 is a diagram illustrating a low coupling part 200A in the first example of the embodiment 4. In a coupling reducing electrode 205A of the low coupling part 200A, a part of the common conductor is made shorter compared with the coupling reducing electrode 205 of the embodiment 1.

Referring to FIG. 18, a common conductor 210A in the coupling reducing electrode 205A of the low coupling part 200A has a substantially L shape and includes a first part 211 extending in parallel to the side 40 in the direction from the side end part 334 to the side end part 333 of the slit 33 and a second part 212 bent to the direction to the close end part 332 from an end part of the first part 211.

A bent portion of the common conductor 210A is connected to a first conductor 220A with the frequency adjustment element 240 interposed therebetween. The first conductor 220A further includes, in addition to the configuration of the first conductor 220 in the coupling reducing electrode 205 of the embodiment 1 (the first part 221, the second part 222, and the third part 223), a fourth part 224 extending in the direction from an end part of the first part 221 along the side end part 333 on the open end part 331 side to the common conductor 210A.

Furthermore, an end part of the second part 212 of the common conductor 210A on the close end part 332 side is connected to a second conductor 230A with the frequency adjustment element 250 interposed therebetween. The second conductor 230A includes a first part 231 extending in the direction from the frequency adjustment element 250 to the side end part 333 and a second part 232 that bends from an end part of the first part 231 on the side end part 333 side and extends in parallel to the side end part 333. An open end of the second part 232 faces the open end of the third part 223 of the first conductor 220A.

In the configuration of the coupling reducing electrode 205A, inductances and capacitances of respective parts are also adjusted in such a way that a resonant frequency of a part formed from the common conductor 210A, the frequency adjustment element 240, and the first conductor 220A becomes equal to the first frequency (2.4 GHz). Furthermore, inductances and capacitances of respective parts are adjusted in such a way that a resonant frequency of a part formed from the common conductor 210A, the frequency adjustment element 250, and the second conductor 230A becomes equal to the second frequency (5 GHz). This allows the low coupling part 200A to function similarly to the low coupling part 200 of the embodiment 1. Note that also in the coupling reducing electrode 205A, one of the frequency adjustment elements 240 and 250 or both may be omitted.

Figure 19:
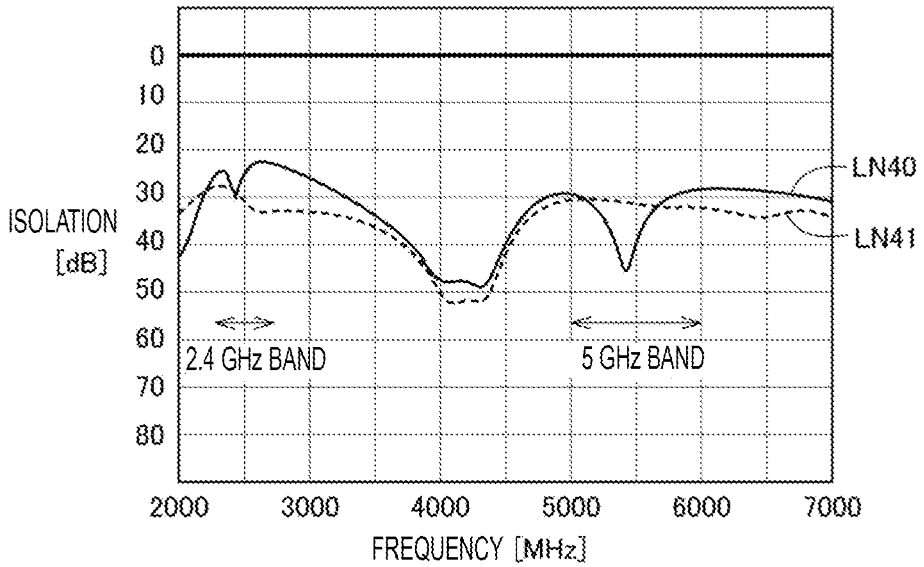
FIG. 19 is a first diagram for illustrating isolation between antenna elements of the antenna devices in the first example of the embodiment 4 and the comparative example 1.
Figures 20, 21:
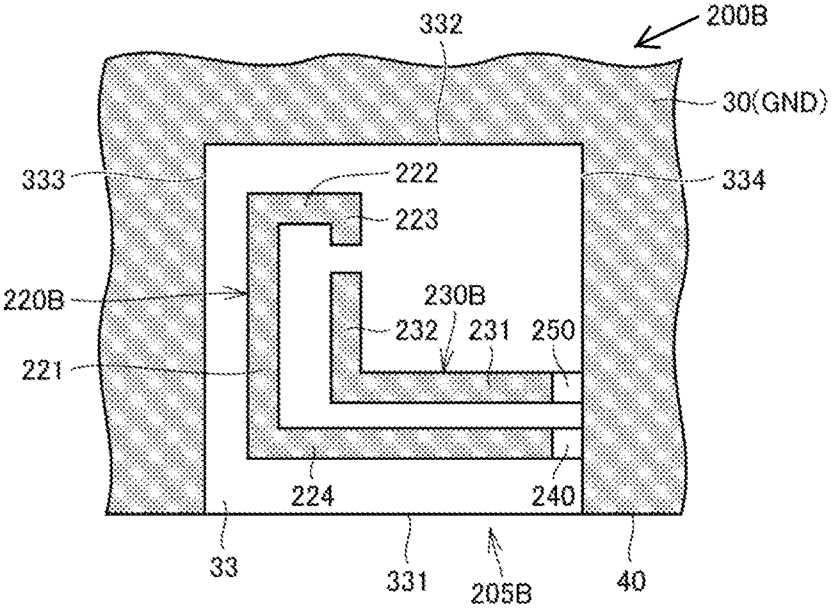
FIG. 20 is a second diagram for illustrating isolation between antenna elements of the antenna devices in the first example of the embodiment 4 and the comparative example 1.
FIG. 21 is a diagram illustrating a low coupling part in a second example of an embodiment 4.

FIG. 19 and FIG. 20 are diagrams for illustrating isolation between the antenna elements in an antenna device including the low coupling part 200A of the first example and the antenna device 100# of the comparative example 1. FIG. 19 is a graph illustrating the change in isolation with respect to frequency, and FIG. 20 illustrates the isolation in two target frequency bands in numerical values. Note that in FIG. 19, a solid line LN40 denotes the result in the case of the first example, and a dashed line LN41 denotes the result in the case of the comparative example 1.

As illustrated in FIG. 19 and FIG. 20, in both the target frequency bands of 2.4 GHz band and 5 GHz band, greater or equal isolation is provided in the case of the low coupling part 200A in the first example of the embodiment 4 compared with the case of the comparative example 1.

Note that compared with a case where no common conductor is used, it becomes possible to lower variations in capacitance between the first conductor and the second conductor by connecting the first conductor and the second conductor in the coupling reducing electrode to the ground electrode with the common conductor interposed therebetween. Furthermore, adjusting the length of the common conductor enables to adjust the sensitivity of the frequency adjustment element.

Second Example

In the low coupling part 200 of the embodiment 1 and the low coupling part 200A of the first example of the embodiment 4, there are described the exemplary configurations in which the coupling reducing electrode 205 and 205A include the common conductor 210 and 210A through which a current flows in both the cases of the first frequency and the second frequency, respectively.

In the second example of the embodiment 4, there will be described an exemplary configuration that does not include the common conductor in the coupling reducing electrode.

FIG. 21 is a diagram illustrating a low coupling part 200B in the second example of the embodiment 4. A coupling reducing electrode 205B of the low coupling part 200B has the configuration in which a first conductor 220B corresponding to the first frequency and a second conductor 230B corresponding to the second frequency are separately connected to the conductor part 30.

As is the case with the first conductor 220A of the first example, the first conductor 220B includes the first part 221 to the fourth part 224. The fourth part 224 of the first conductor 220B extends along the side 40 in the direction from an end part of the first part 221 on the open end part 331 side to the side end part 334 and is connected to the conductor part 30 with the frequency adjustment element 240 interposed therebetween.

Similarly, as is the case with the second conductor 230A of the embodiment 4, the second conductor 230B includes the first part 231 and the second part 232. The first part 231 extends along the side 40 in the direction from an end part of the second part 232 on the open end part 331 side to the side end part 334 and is connected to the conductor part 30 with the frequency adjustment element 250 interposed therebetween.

In the configuration of the coupling reducing electrode 205B, inductances and capacitances of respective parts are also adjusted in such a way that a resonant frequency of a part formed from the first conductor 220B and the frequency adjustment element 240 becomes equal to the first frequency (2.4 GHz). Furthermore, inductances and capacitances of respective parts are adjusted in such a way that a resonant frequency of a part formed from the second conductor 230B and the frequency adjustment element 250 becomes equal to the second frequency (5 GHz). This allows the low coupling part 200B to function similarly to the low coupling part 200 of the embodiment 1. Note that also in the coupling reducing electrode 205B, one of the frequency adjustment elements 240 and 250 or both may be omitted.

Figures 22, 23:
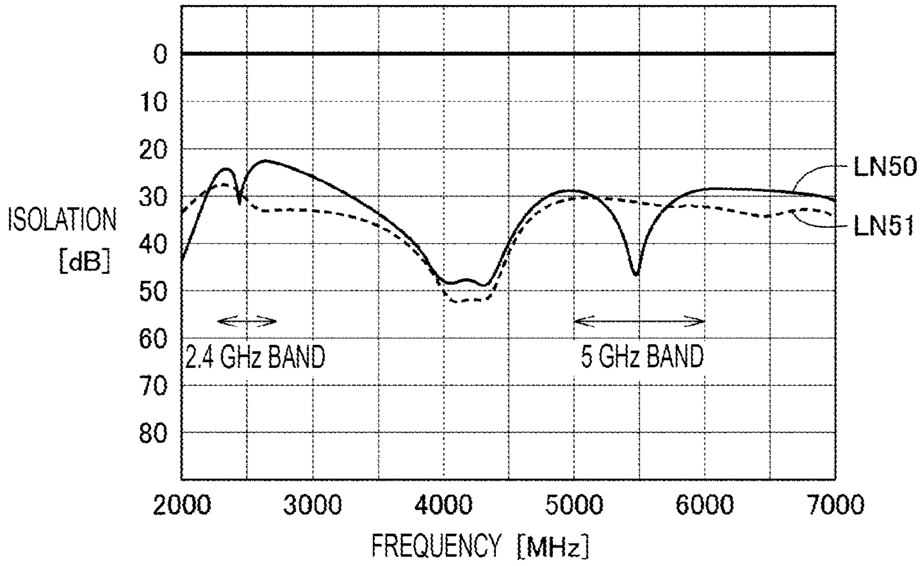
FIG. 22 is a first diagram for illustrating isolation between antenna elements of the antenna devices in the second example of the embodiment 4 and the comparative example 1.
FIG. 23 is a second diagram for illustrating isolation between antenna elements of the antenna devices in the second example of the embodiment 4 and the comparative example 1.

FIG. 22 and FIG. 23 are diagrams for illustrating isolation between the antennas in an antenna device including the low coupling part 200B of the second example and the antenna device 100# of the comparative example 1. FIG. 22 is a graph illustrating the change in isolation with respect to frequency, and FIG. 22 illustrates the isolation in two target frequency bands in numerical values. Note that in FIG. 23, a solid line LN50 denotes the result in the case of the second example, and a dashed line LN51 denotes the result in the case of the comparative example 1.

As illustrated in FIG. 22 and FIG. 23, in both the target frequency bands of 2.4 GHz band and 5 GHz band, greater or equal isolation is provided in the case of the low coupling part 200B in the second example of the embodiment 4 compared with the case of the comparative example 1. Furthermore, the sensitivity of the frequency adjustment element increases by making separate connection of the coupling reducing electrode to the ground electrode without using the common conductor as described above, and this expands the range of frequency adjustment.

As described above, in the antenna module including two antenna elements arranged in the conductor part (ground electrode), it becomes possible to provide isolation between the two antenna elements while effectively using the area of the conductor part by forming the coupling reducing electrode that resonates at two frequencies (first frequency and second frequency) in the inside of the slit on a path leading from one of the antenna elements to the other antenna element. At this time, it becomes possible to reduce the size of the coupling reducing electrode by arranging the open end of the first conductor corresponding to the first frequency and the open end of the second conductor corresponding to the second frequency opposite to each other in the coupling reducing electrode to obtain the capacitance efficiently.

Note that in the foregoing description, there are described the exemplary cases where two antenna elements are both so-called dual-band antenna elements capable of emitting radio frequency signals of two different frequency bands. However, each of the antenna elements may not necessarily be a dual-band antenna element.

For example, one of the antenna elements may be a dual-band antenna element capable of radiating signals of the first frequency and the second frequency, and the other antenna element may be a single-band antenna element capable of radiating only a signal of the first frequency or the second frequency.

Alternatively, two antenna elements may be both single-band antenna elements. Here, one of the two antenna elements may be an antenna element capable of radiating a signal of the first frequency, and the other antenna element may be an antenna element capable of radiating a signal of the second frequency.

Furthermore, even in the case where two antenna elements are both single-band antenna elements and both radiate a signal of the same frequency band, the low coupling part described above may be employed. More specifically, in the case with a so-called multiband antenna device where the width of frequency band of a signal to be radiated is wide and two attenuation regions are needed in this frequency band, it becomes possible to provide isolation between the antenna elements by forming the low coupling part in such a manner as to block signals of frequencies corresponding to the two attenuation regions.

It is to be understood that the embodiments described in the present disclosure are exemplary in all aspects and are not restrictive. It is intended that the scope of the present disclosure is defined by the claims, not by the description of the embodiments described above, and includes all variations which come within the meaning and range of equivalency of the claims.

1 Communication device
10 Antenna module
112, 210, 210A Common conductor
30 Conductor part
31-35 Slit
40, 41 Side
60 Resin substrate
100, 100A-100D, 100A#, 100C# Antenna device
110, 110A, 120, 120A Antenna element
111 Radiation electrode
113, 220, 220A, 220B First conductor
114, 230, 230A, 230B Second conductor
115, 116, 240, 250 Frequency adjustment element
151A, 151B, 153A, 153B, 157 Switch
152AR, 152BR Low noise amplifier
152AT, 152BT Power amplifier
154A, 154B Attenuator
156 Signal multiplexer/demultiplexer
158 Mixer
159 Amplifier circuit
200, 200A, 200B Low coupling part
205, 205A, 205B Coupling reducing electrode
211, 221, 231, 1131 First part
212, 222, 232, 1132 Second part
223, 1133 Third part
224 Fourth part
311, 331 Open end part

312, 332 Close end part
313, 314, 333, 334 Side end part
C1 Corner part
GND Ground electrode
SP Power feed part.

The invention claimed is:

1. An antenna module comprising:
a ground electrode having a first slit that forms a first opening along a perimeter of the ground electrode;
a first antenna and a second antenna arranged in or on the ground electrode; and
a coupling reducing electrode connected to the ground electrode within the first slit, wherein
the first slit is provided on a path leading from the first antenna to the second antenna along the perimeter of the ground electrode, and
the coupling reducing electrode includes a first conductor having a first length corresponding to a first frequency and a second conductor having a second length corresponding to a second frequency, the second frequency being higher than the first frequency.

2. The antenna module according to claim 1, wherein
each of the first conductor and the second conductor includes a first end part that is connected to the ground electrode and a second end part that is in an open state, and
the second end part of the first conductor and the second end part of the second conductor are opposite to each other.

3. The antenna module according to claim 1, wherein
at least one of the first antenna or the second antenna is configured to transmit signals of both the first frequency and the second frequency.

4. The antenna module according to claim 1, wherein
the first antenna is configured to transmit at least a first signal of the first frequency, and
the second antenna is configured to transmit at least a second signal of the second frequency.

5. The antenna module according to claim 2, wherein
at least one of the first end part of the first conductor or the first end part of the second conductor is connected to the ground electrode with a frequency adjustment element interposed therebetween.

6. The antenna module according to claim 2, wherein
the coupling reducing electrode further includes a common conductor connected to the ground electrode, and
the first conductor and the second conductor are connected to the ground electrode with the common conductor interposed therebetween.

7. The antenna module according to claim 6, wherein
at least one of the first end part of the first conductor or the first end part of the second conductor is connected to the common conductor with a frequency adjustment element interposed therebetween.

8. The antenna module according to claim 5, wherein
the frequency adjustment element connected to the first conductor is configured in such a way that an impedance of the first conductor looking from the ground electrode is lower than an impedance of the second conductor looking from the ground electrode at the first frequency, and
the frequency adjustment element connected to the second conductor is configured in such a way that the impedance of the second conductor looking from the ground electrode is lower than the impedance of the first conductor looking from the ground electrode at the second frequency.

9. The antenna module according to claim 1, wherein
at least one of the first antenna or the second antenna is a notch antenna.

10. The antenna module according to claim 9, wherein
the notch antenna includes
a radiation electrode arranged inside a second slit that forms a second opening along the perimeter of the ground electrode, and
a power feed part that supplies a radio frequency signal to the radiation electrode, and
the radiation electrode has a configuration similar to that of the coupling reducing electrode.

11. The antenna module according to claim 1, wherein
at least one of the first antenna or the second antenna is a line-like antenna.

12. The antenna module according to claim 1, wherein
the ground electrode has a substantially rectangular shape including a first side and a second side, the first side being adjacent to the second side,
the first antenna is arranged at the first side,
the second antenna is arranged at the second side, and
the first slit is provided on the path leading from the first antenna to the second antenna along the first side and the second side.

13. The antenna module according to claim 1, wherein
the ground electrode has a substantially rectangular shape including a first side and a second side, the first side being adjacent to the second side,
the first antenna and the second antenna are arranged at the first side of the ground electrode, and
the first slit is provided at the first side on the path leading from the first antenna to the second antenna.

14. The antenna module according to claim 1, wherein
the coupling reducing electrode is configured to provide an attenuation region in the first frequency and the second frequency.

15. The antenna module according to claim 1, wherein
a length of the first slit from the first opening to a close end part thereof is shorter than ¼ of a wavelength corresponding to the first frequency.

16. The antenna module according to claim 2, wherein
a length of the first slit from the first opening to a close end part thereof is shorter than ¼ of a wavelength corresponding to the first frequency.

17. The antenna module according to claim 1, further comprising:
a power feed circuit configured to supply a radio frequency signal to the first antenna and the second antenna.

18. The antenna module according to claim 2, further comprising:
a power feed circuit configured to supply a radio frequency signal to the first antenna and the second antenna.

19. A communication device incorporating the antenna module according to claim 1.

20. A communication device incorporating the antenna module according to claim 2.

* * * * *